June 9, 1964
E. E. HEWITT
3,136,222
PNEUMATICALLY CONTROLLED GOVERNOR
Original Filed Nov. 26, 1957
3 Sheets-Sheet 3
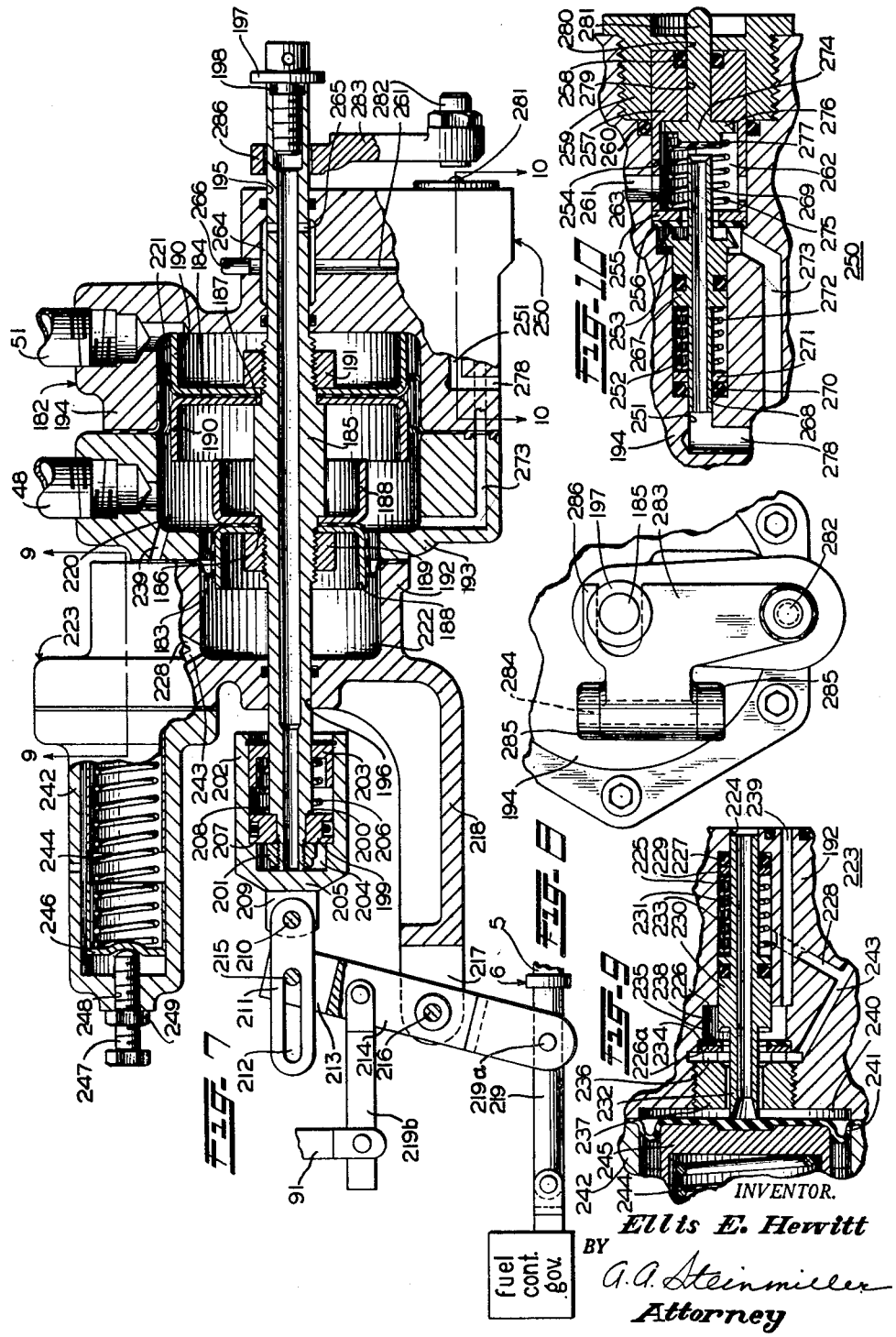
INVENTOR.
*Ellis E. Hewitt*
BY
*G. G. Steinmiller*
Attorney United States Patent Office 3,136,222
Patented June 9, 1964

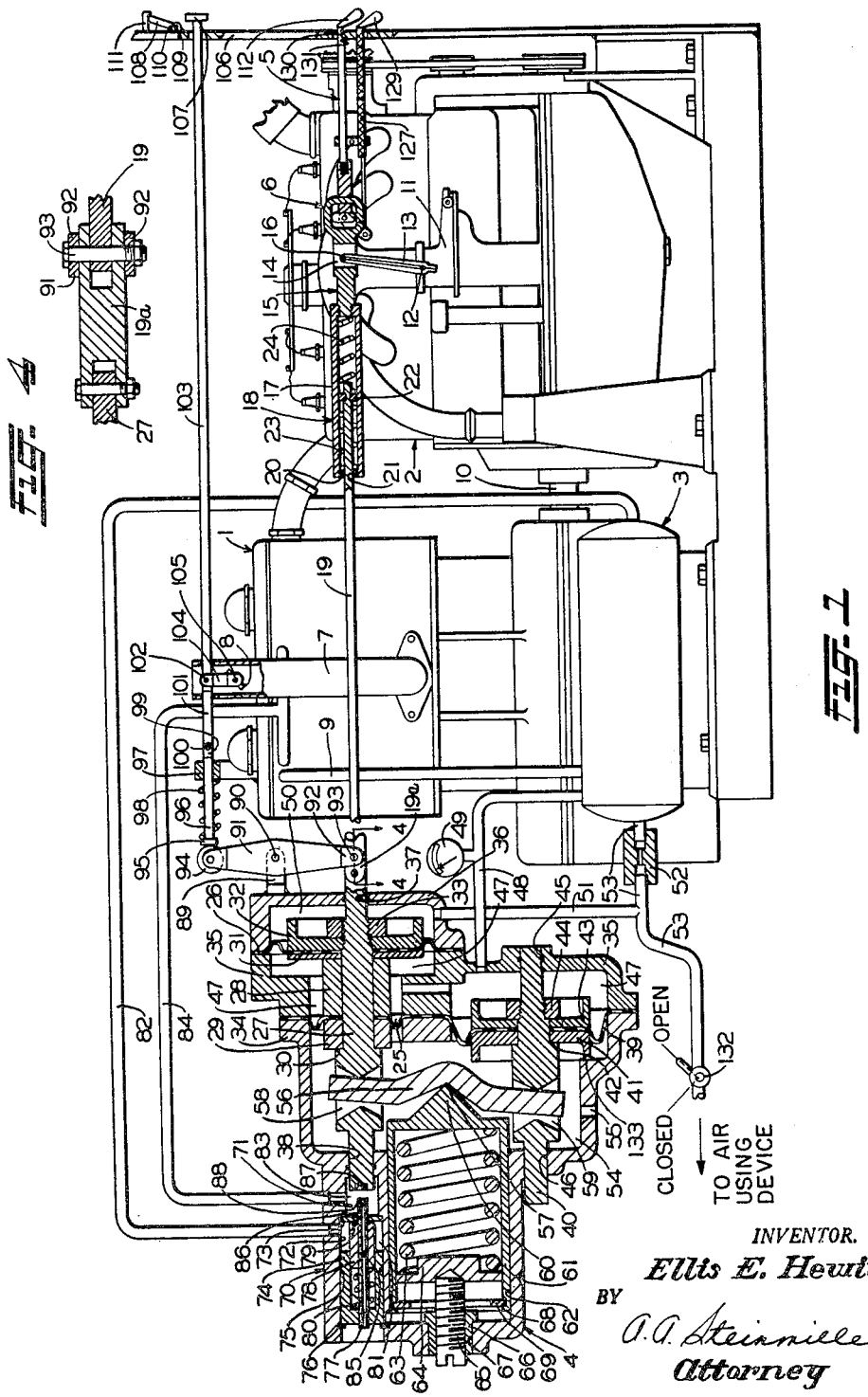

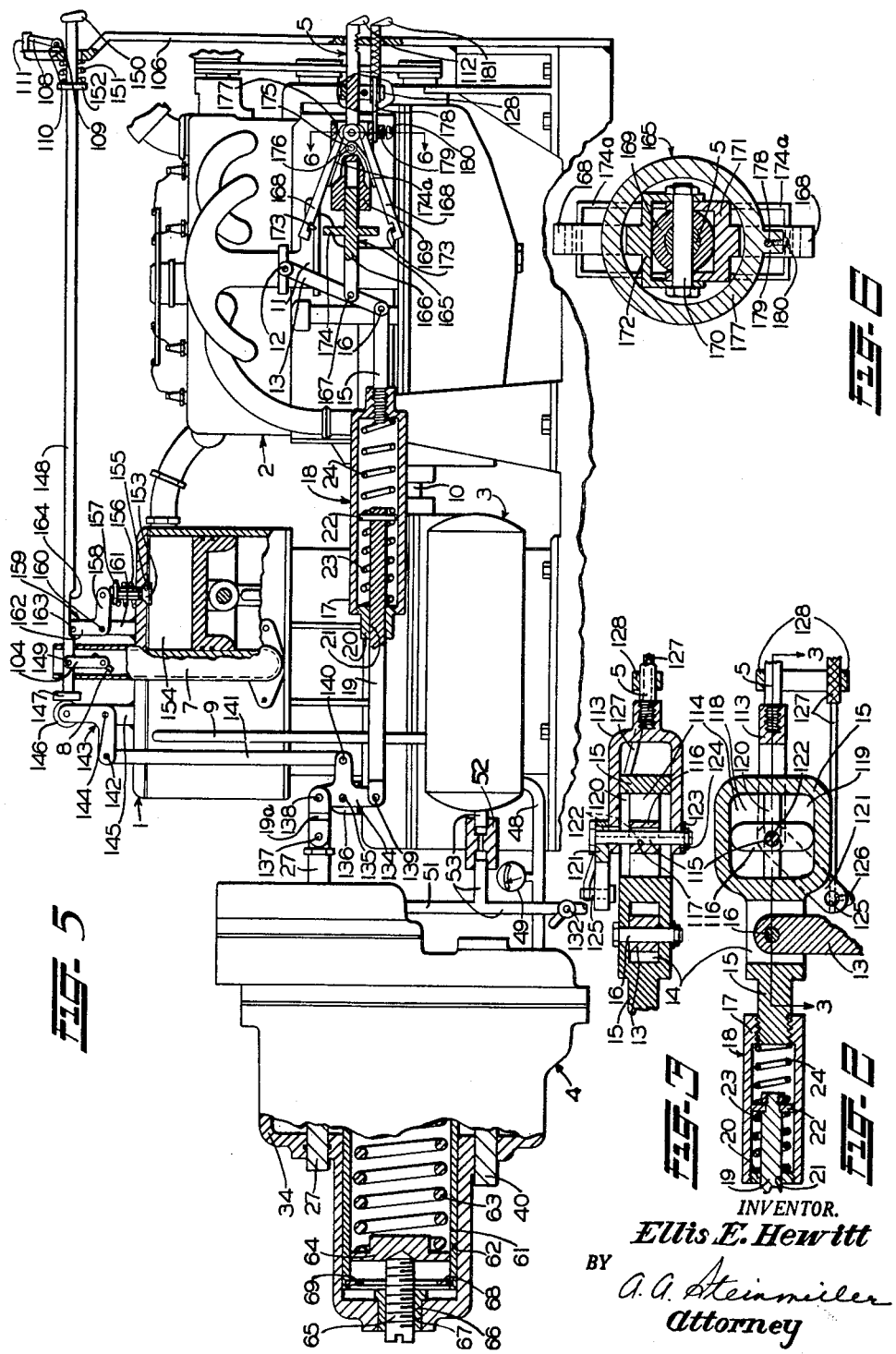

3,136,222
PNEUMATICALLY CONTROLLED GOVERNOR
Ellis E. Hewitt, Ruffsdale, Pa., assignor to Westinghouse Air Brake Company, Wilmerding, Pa., a corporation of Pennsylvania
Original application Nov. 26, 1957, Ser. No. 698,953, now Patent No. 3,043,495, dated July 10, 1962. Divided and this application Nov. 3, 1961, Ser. No. 150,035
8 Claims. (Cl. 91—168)

This invention relates to a pneumatically controlled governor and more particularly to such a governor for automatically regulating the speed of an engine and the loading and unloading of an air compressor driven by the engine whereby the compressor is loaded and unloaded according to the rate of use of the fluid compressed by the compressor; this application being a division of my copending application, Serial No. 698,953, filed November 26, 1957, now Patent No. 3,043,495.

Air compressors of the so-called mobile or portable type which are mounted on wheel trucks or tractors are usually self-contained units driven by an internal combustion engine. It is common practice to provide these compressors with governors which are adapted to unload the compressor and to throttle or reduce the fuel supply to the engine driving the compressor so as to reduce the engine speed when the pressure of the fluid compressed by the compressor exceeds a predetermined value, so that the compressor is driven unloaded by the engine operating at idle speed.

Such operation is satisfactory where a large storage tank is employed, but in the case of a mobile compressor unit, the capacity of the storage tank or reservoir is limited so that the compressor is constantly being loaded and unloaded, and engine speed reduced from full speed to idling speed at frequent intervals. This constant changing of the compressor load and engine speed materially reduces the efficiency of the compressor unit and increases the wear on both the compressor and the engine due to the frequent reoccurring accelerating and decelerating phases of the operating cycle.

It is the principal object of the present invention to provide an automatically operable governor jointly controlled according to the pressure of the fluid in the reservoir and the rate of flow of fluid under pressure from the reservoir to the place of use for controlling the speed of an internal combustion engine driven compressor unit.

Another object of the invention is to provide a governor of the type described in the preceding object wherein the governor is automatically operative to increase or decrease the speed of the driving engine in response to an increase or decrease in the rate of use of fluid under pressure until the compressed fluid supplied by the compressor equals the demand.

Another object of the invention is a provision of a governor of the type indicated in the foregoing objects constructed and arranged so as to automatically load and unload the compressor in response to variations of the reservoir pressure with respect to a chosen value.

In its preferred embodiment, several of which are herein disclosed, and described, the governor comprising this invention includes a casing in which two coaxially related spaced-apart diaphragm pistons of unequal area are mounted on a common shaft. A chamber that is formed between the diaphragm pistons is one of two connected to the storage reservoir. One of two chambers formed on the opposite sides of the respective diaphragm pistons is connected to the downstream side of a choke that controls the flow of fluid under pressure from the reservoir to a place of use. The other of the two chambers is charged with fluid under pressure to a chosen trapped pressure determined by a regulating valve. Variations in the pressure in the several chambers establish a pressure differential to move the shaft in one direction or in an opposite direction to effect the operation of an engine fuel control governor for automatically controlling the speed of the engine. A valve mechanism operated by movement of the shaft is effective to control the supply of fluid under pressure to and from a fluid pressure operated compressor unloader to control unloading and loading of the compressor.

In the accompanying drawings:

FIG. 1 is an elevational view, partly in section, of a mobile engine-driven compressor unit embodying a manually and an automatically operative governor control apparatus constructed and operated in accordance with one embodiment of the invention, portions of the governor control apparatus being enlarged disproportionately for clarity.

FIG. 2 is a sectional view showing, at an enlarged scale, certain details of the locking mechanism between the manually and automatically operative governor control apparatus shown in FIG. 1.

FIG. 3 is a cross-sectional view, taken on the line 3—3 of FIG. 2, looking in the direction of the arrows and showing additional details of the locking mechanism.

FIG. 4 is a cross-sectional view, taken on the line 4—4 of FIG. 1, looking in the direction of the arrows and showing additional details of the linkage connecting the throttle operating rod of the governor control apparatus to the compressor unloading mechanism.

FIG. 5 is an elevational view, partly in section, of an engine-driven compressor unit embodying a manually and an automatically operative governor control apparatus constructed and operated in accordance with a second embodiment of the invention.

FIG. 6 is a cross-sectional view, taken on the line 6—6 of FIG. 5, looking in the direction of the arrows and showing, at an enlarged scale, certain other details of the locking mechanism of FIG. 5.

FIG. 7 is an elevational view, partly in section, of a third embodiment of an automatically operative governor control apparatus generally similar in function to the automatically operative governor control apparatus shown in FIG. 1 but differing therefrom in certain details of structure and operation, and adapted to be operatively connected to a fuel governor of known construction.

FIG. 8 is a partial right-end elevational view of the automatically operative governor control apparatus shown in FIG. 7.

FIG. 9 is a cross-sectional view, taken on the line 9—9 of FIG. 7, looking in the direction of the arrows and showing, at an enlarged scale, certain details of the automatically operative governor control apparatus shown in FIG. 7.

FIG. 10 is a cross-sectional view, taken on the line 10—10 of FIG. 7, looking in the direction of the arrows and showing, at an enlarged scale, certain other details of the automatically operative governor control apparatus shown in FIG. 7.

Description—FIGS. 1 to 4

As shown in FIG. 1 of the drawings, the fluid compressing apparatus comprises a fluid compressor 1, a power means, such as an internal combustion engine 2 for driving the compressor, a storage reservoir 3 for receiving the fluid under pressure compressed by the compressor 1, an automatic engine governing and compressor unloading control device 4, hereinafter called the compressor unit control device, a manual engine governing control rod 5, hereinafter called the manual control rod, and a locking mechanism 6, for connecting and disconnecting the control rod 5 to the air inlet control valve of the compressor 1 and the throttle valve of the engine 2.

The compressor 1 is provided with an intake pipe 7 in which is pivotally mounted adjacent its outer end a fluid controlling inlet valve 8 of the butterfly type which, when in a minimum open position, limits the supply of fluid to the compressor. The compressor is also provided with a combined unloading and inlet valve device, the details of which are not shown but which may be substantially the same as that shown in FIG. 2 of Patent No. 1,998,265 issued to Burton S. Aikman, April 16, 1935. The fluid compressed by the compressor 1 is conducted to storage reservoir 3 through a pipe 9.

A crankshaft 10 of the compressor 1 is directly connected to the crankshaft of the engine 2. The engine 2 is provided with a fuel control means, such as the usual carburetor device 11, having an air inlet butterfly or throttle valve (not shown) of the usual type, which, when closed, limits the supply of fuel to the engine 2, and when in the open position, permits a maximum supply of fuel to be delivered to the engine in order to obtain the maximum power output therefrom. The throttle valve is mounted on a shaft 12 journaled in the casing of the carburetor 11 and has an operating arm 13 attached to the outer end of the shaft. The arm 13 extends into a rectangular slot 14 formed in a rod 15 intermediate the ends of the rod and is pivotally connected to the rod 15, as by a pin 16.

As shown in FIG. 2 of the drawings, the left-hand end of rod 15 is threaded to receive the right-hand end of a hollow sleeve 17 of a resilient connection 18 by which the rod 15 is connected to an automatic throttle control rod 19 operatively connected to the control device 4. The left-hand end of sleeve 17 is threaded to receive a threaded plug 20 having a bore 21 through which the rod 19 extends into the interior of the sleeve. A piston 22 is slidably operable within the sleeve 17 and is secured as by a nut to the rod 19 adjacent the right-hand end of the rod. Disposed within the sleeve 17 and on opposite sides of piston 22 are two comparatively light springs 23 and 24. Each spring bears against one face of the piston 22 and one end of the sleeve 17. These springs serve to normally bias the piston 22 to a position midway between the ends of the sleeve 17 in which position the piston is shown in FIGS. 1 and 2, and to permit movement of the sleeve 17 and rod 15 without transmitting any movement to the rod 19 when the engine 2 is manually controlled by the manual control rod 5 as will be hereinafter described.

The left-hand end of the automatic throttle control rod 19 is connected to the right-hand end of a link 19a (see FIG. 4) through which the control device 4 effects movement thereof.

Considering the compressor unit control device 4 in greater detail, said control device comprises a differential area abutment consisting of two coaxially related abutments shown as diaphragms 25 and 26 of unequal area mounted on a common stem 27 and spaced apart by a spacer 28. The central portion of the diaphragm 25 is clamped between the spacer 28 and a diaphragm follower 29 which rests against a shoulder 30 formed on the stem 27. The central portion of the diaphragm 26 is clamped between a diaphragm follower 31 which rests against the spacer 28, and a diaphragm follower 32 forced against the diaphragm 26 by a nut 33 having screw-threaded engagement with the stem 27. The diaphragm 25 is clamped around its outer edge between two casing sections 34 and 35, and the diaphragm 26 is clamped around its outer edge between the casing section 35 and a cover 36.

The stem 27 and diaphragms 25 and 26 are mounted for limited movement in an axial direction within the control device 4 by having the right-hand end of stem 27 slidably mounted in a bore 37 formed in the center of cover 36 and the left-hand end of the stem slidably mounted in a bore 38 formed in the casing section 34. The right-hand end of the stem 27 extends to the exterior of the cover 36 and is operatively connected to the link 19a and through this link to the automatic throttle control rod 19 to transmit to the throttle valve of the carburetor 11, through rod 19 and arm 13, any deflection of the diaphragms 25 and 26.

The control device 4 further comprises a third diaphragm 39 having an effective area greater than the effective area of diaphragm 25 and less than the effective area of diaphragm 26. The diaphragm 39 is mounted on a stem 40 arranged in spaced-apart parallel relation to the stem 27. The central portion of the diaphragm 39 is clamped between a diaphragm follower 41 which rests against a shoulder 42 formed on the stem 40 and a diaphragm follower 43 forced against the diaphragm 39 by a nut 44 which has screw-threaded engagement with the stem 40. The diaphragm 39 is clamped around its outer edge between the two casing sections 34 and 35 the same as the outer edge of the diaphragm 25. The outer edges of the two diaphragms 25 and 39 are arranged to lie in the same plane and the adjacent portions of these edges may be joined together, if desired, to form the two diaphragms into one continuous element.

The stem 40 and diaphragm 39 are mounted for limited movement in an axial direction within the control device 4 by having the right-hand end of stem 40 slidably mounted in a bore 45 formed in the casing section 35 and the left-hand end of the stem slidably mounted in a bore 46 formed in the casing section 34.

The three diaphragms 25, 26 and 39 cooperate with the casing section 35 to form a chamber 47 which is connected by a pipe 48 to the storage reservoir 3. A pressure gage 49 is connected to the pipe 48 to always indicate to an observer the pressure in the reservoir 3 and the chamber 47.

The diaphragm 26 and cover 36 cooperate to form a chamber 50 which is connected by a pipe 51 to the outlet side of a choked fitting 52 located in a pipe 53 leading from the storage reservoir 3 to the place of use of the fluid under pressure stored in the reservoir.

The two diaphragms 25 and 39 cooperate with the casing section 34 to form a chamber 54 which is open to atmosphere through a port 55. Located within the chamber 54 is a yoke-shaped lever 56 having on its left-hand side a V-shaped recess 57 which is located midway the ends of the lever to divide the lever into two arms of equal length. The upper arm extends through a slot 58 formed in the stem 27 and the lower arm extends through a slot 59 formed in the stem 40. The V-shaped recess 57 receives a coned-shaped end 60 of a cylindrical cupped-shaped spring housing 61 which is slidably operable within a bore 62 formed in the casing section 34. The spring housing 61 has its axis parallel to the axis of the stems 27 and 40 and is adapted to receive a spring 63 which is disposed between the right-hand end of the housing 61 and a spring seat 64 also located within the housing. The spring 63 acting through the coned-shaped end 60 of the housing 61 biases the opposite ends of the lever 56 against the stems 27 and 40 to, in the absence of fluid under pressure in chambers 47 and 50, move these stems in the direction of the right hand until the diaphragm follower 32 carried by the stem 27 engages the cover 36 and the diaphragm follower 43 carried by the stem 40 engages the casing section 35.

In order to provide for adjusting the tension on the spring 63, the spring seat 64 has a cone-shaped notch formed on its left-hand face to receive the end of an adjusting screw 65 which has screw-threaded engagement with a threaded bushing 66 pressed into a bore 67 in the casing section 34.

In order to permit assembling the spring housing 61, spring seat 64 and spring 63 as a unit, the spring housing 61 has adjacent its left-hand end a circumferential interior groove 68 for receiving a snap ring 69 after the spring 63 and spring seat 64 are placed within the spring housing 61.

Located within the casing section 34 is a fluid actuated control valve mechanism 70 for supplying fluid under pressure from reservoir 3 to the unloading mechanism (not shown) of the compressor 1 in response to the pressure of the fluid compressed by the compressor and stored in the reservoir 3 reaching a chosen high value.

The casing section 34 is provided with a bore 71 and a coaxial counterbore 72. A disc-type valve seat 73 rests against an annular shoulder formed at the right-hand end of the counterbore 72. A bushing 74 having an O-ring seal 75 is disposed in the left-hand end of counterbore 72 and is retained in place by a snap ring 76. The bushing 74 is provided with a bore 77 in which a valve unit 78 may reciprocate. The valve unit 78 has formed on the right-hand end of its large diameter, a supply valve 79. Disposed within the bore 77 between the left-hand end of valve unit 78 and an inturned flange formed on the left-hand end of bushing 74 is a spring 80 for normally biasing the supply valve 79 into engagement with seat 73 to close communication between a chamber 81 connected to the reservoir 3 by a pipe 82 and a chamber 83 connected by a pipe 84 to the unloading mechanism of the compressor 1.

The valve unit 78 is provided with a central bore 85 into which is press-fitted a hollow sleeve 86. The right-hand end of sleeve 86 extends into the chamber 83 and the left-hand end of the sleeve extends through the inturned flange formed on the left-hand end of bushing 74 to the exterior of casing section 34. The hollow sleeve 86 normally connects the chamber 83, pipe 84 and the unloading mechanism of the compressor 1 to atmosphere to permit loading of the compressor.

The left-hand end of stem 27 is provided with a resilient insert 87. When the stem 27 is moved in the direction of the left hand, in response to the pressure in reservoir 3 reaching the hereinbefore-mentioned high value, as will be hereinafter explained, it will first engage the right-hand end of sleeve 86 which constitutes an exhaust valve 88, to close communication between the unloader and atmosphere. Further movement of the stem 27 in the direction of the left hand will then unseat the supply valve 79 from its seat 73 to permit the flow of fluid under pressure from the reservoir 3 to the unloader to unload the compressor.

In order to provide for automatic operation of the air inlet valve 8 of the compressor 1 by the control device 4, a lug 89 is secured, as by welding, to the cover 36. Suitably fulcrumed to the lug 89, as by a pin 90, is a lever 91, one end of which is provided with a clevis 92 which is pivotally connected to the rod 19 and link 19a by a pin 93 (see FIG. 4). The opposite end of the lever 91 is bifurcated and carries a roller 94 which is adapted to contact a collar 95 formed at the left-hand end of a rod 96. The rod 96 is slidably mounted in a bracket 97 secured, as by welding, to the top head of the compressor 1. Disposed between the collar 95 and the bracket 97, and surrounding the rod 96, is a spring 98 for normally biasing the collar 95 into engagement with the roller 94. The right-hand end of rod 96 has a clevis 99 which is connected by a pin 100 to one end of a link 101. The opposite end of the link 101 is pivotally connected, as by a pin 102, to one end of a manual unloading control rod 103 and an air inlet valve control lever 104. The lever 104 and the air inlet valve 8 are both mounted on a shaft 105 which has its opposite ends journaled in the compressor air intake pipe 7.

The right-hand end of the control rod 103 extends through a bore in a vertically arranged control panel 106 located at the front end of the engine 2 and secured to the base of the engine, as by welding. A handle 107 is secured to the right-hand end of rod 103 to permit an operator to manually control the position of air inlet valve 8 by moving the rod in the direction of the right hand to rock the lever 104 and intake valve 8 clockwise until the valve 8 occupies its minimum open position in which position it partly cuts off the flow of atmospheric air through the pipe 7 to the inlet valve chamber (not shown) of the compressor 1.

In order to provide for locking the air inlet valve 8 in its minimum open position, one end of a short lever 108 is pivotally connected by means of a pin 109 to a lug 110 secured to the panel 106, as by welding. The lever 108 is normally held in a raised position in which it is shown in FIG. 1 by a spring latch 111 which is suitably secured, as by riveting, to the panel 106. When the rod 103, lever 104 and valve 8 are moved to the minimum open position of the valve 8 to reduce flow through pipe 7, the lever 108 may be manually released from the latch 111 and rotated clockwise until the free end of the lever contacts the upper side of rod 103 on the left-hand side of the handle 107. When the lever 108 occupies this position, movement of rod 103 in the direction of the left hand by the spring 98 is prevented and valve 8 is maintained in its minimum open position.

In order to permit manual control of the speed of the engine 2 by the control rod 5, the manually operated locking mechanism 6 is provided for connecting the rod 5 to the rod 15. The right-hand end of the rod 5 extends through a bore in the control panel 106 and secured to the end of the rod is a handle 112 to permit the operator to manually control the speed of the engine 2 by moving the rod 5 either in a right-hand or a left-hand direction.

As can be clearly seen in FIGS. 2 and 3, the left-hand end of rod 5 has screw-threaded engagement with a clevis 113. Disposed between opposite fingers of clevis 113 is the right-hand end of rod 15. This end of rod 15 is enlarged and provided with a vertically arranged substantially square opening 114. Rotatably mounted within the opening 114 on a pin 115 is a locking key 116 keyed thereto for, when in the position in which it is shown in FIG. 2, unlocking the manual control rod 5 from rod 15, and for, when rocked to a position at right angles to the position in which it is shown in FIG. 2, to rigidly lock rod 5 to rod 15. The width of locking key 116 is substantially less than the width of square opening 114. In assembling the locking mechanism 6, the locking key 116, which has a central bore 117 provided with a keyway, is placed in the square opening 114. Then one plate of each of two pairs of spaced-apart plates 118 and 119 is placed on each side of locking key 116. The length of each plate is the same as the length of square opening 114 and the height is such that a central gap or opening 120 equal to the diameter of pin 115 is formed between each pair of plates. The plates after being assembled in place are secured to the rod 15, as by welding or other suitable means. After the locking key 116 and plates 118 and 119 are thus assembled, the opposite fingers of clevis 113 are slid over the right-hand end of rod 15 until the perforations in the fingers are aligned with the central openings 120 between the plates 118 and 119 and bore 117 in locking key 116.

A lever 121 is then slid onto pin 115 and secured to the pin by a key 122 which fits in a keyway formed in the pin and the lever. With the lever 121 thus assembled to pin 115 and resting against the head of the pin, the pin 115 and key 122 are inserted through the perforations in the fingers in clevis 113, openings 120, and bore 117 and its keyway in locking key 116. With the parts of the locking mechanism thus assembled, the pin 115 is retained in place by a washer 123 and a snap ring 124.

In order to permit the operator to manually rotate the locking key 116 from its locked position to its unlocked position, and vice versa, the lever 121 carries on its outer end a pin 125 to which is secured, as by a set screw 126, one end of a Bowden wire 127. The Bowden wire 127 extends through a support 128, which also supports the rod 5, and a bore in the control panel 106. A handle 129 secured to the end of the Bowden wire 127 permits the operator to exert a pull on wire 127 to rock the lever 121 and locking key 116 counterclockwise from the position in which they are shown in FIGS. 2 and 3 to a position in which the locking key 116 occupies a position at right angles to the position in which it is shown. When the key 116 occupies this position within the square slot 114, the opposite ends of the key contact the vertical side walls of the square opening 114 and thus lock the manual control rod 5 to the rod 15. With the manual control rod 5 thus locked to the rod 15, the operator can adjust the position of the butterfly valve in the carburetor 11 to manually control the speed of the engine 2.

In order to unlock the manual control rod 5 from the rod 15 to permit automatic control of the speed of the engine 2 by the compressor unit control device 4, it is only necessary for the operator to exert a push on the handle 129 to, through the Bowden wire 127, rotate the lever 121 clockwise and move the locking key 116 back to the position in which it is shown in FIG. 2.

*Operation*

In operation, let it be assumed that the engine 2 and compressor 1 are stopped, and reservoir 3, chamber 47 and chamber 50 are all at atmospheric pressure. In the absence of fluid under pressure in chambers 47 and 50, the spring 63, acting through spring housing 61 and lever 56, will maintain stem 27 in a position in which diaphragm follower 32 contacts cover 36, and stem 40 in a position in which diaphragm follower 43 contacts casing section 35. When the stem 27 occupies the position in which diaphragm follower 32 engages cover 36, the throttle valve of the carburetor 11 will be in its full speed position since the arm 13 and the throttle valve are both mounted on shaft 12 and the arm 13 is connected to stem 27 through rod 19 and link 19a.

Let it be further assumed that the compressor 1 is manually partly unloaded by the operator exerting a pull on the handle 107 to move the rod 103, link 101, and rod 96 in the direction of the right hand against the force of spring 98 until the short lever 108 can be released from spring latch 111 and rotated clockwise from the position in which it is shown in FIG. 1 to a position in which the free end of the lever 108 contacts the upper surface of rod 103 on the left-hand side of the handle 107 and rests against the handle to maintain the rod 103 against movement in the direction of the left hand by spring 98 upon the operator releasing handle 107. When the rod 103 is moved in the direction of the right hand to the locked position, the lever 104 and air inlet valve 8 are rocked in a clockwise direction until the valve 8 occupies its minimum open position to limit the amount of atmospheric air that may be admitted to the compressing chamber (not shown) of the compressor 1.

Also assume that the locking mechanism 6 is operated to lock the manual throttle control rod 5 to the rod 15 by the operator exerting a pull on the handle 129 to, through the Bowden wire 127 and lever 121, rotate the locking key 116 from the position in which it is shown in FIG. 2 to a position at right angles to this position in which the opposite ends of the key contact the opposite vertical walls of the square opening 114. Further assume that, with the rod 5 thus locked to the rod 15, the operator, by exerting a push in the direction of the left hand on the handle 112, moves the rod 5 to rock the operating arm 13 and the butterfly type throttle control valve of the carburetor 11 from the full speed position to a position to operate the engine at a speed slightly above idling speed.

It will be noted that, since spring 63 is a much heavier spring than the spring 24, as the manual throttle control rod 5 is moved in the direction of the left hand, the spring 24 will be compressed and no movement will be imparted through rod 19 and link 19a to the stem 27 of the control device 4.

The rod 5 is provided with several serrations 130, one of which is adapted to engage a single serration 131 formed on the panel 106 to lock the rod 5 in any position to which it may be manually moved by the operator. Therefore, when the rod 5 has been moved to the position in which the throttle control valve of the carburetor 11 has been rocked to the position to operate the engine 2 at a speed slightly above idling speed, the rod 5 and the throttle control valve may be locked in this position upon the operator releasing the handle 112.

With the compressor 1 unloaded, the reservoir 3 and chambers 47, 50 at atmospheric pressure, the throttle control valve of the carburetor 11 in a position to operate the engine 2 at a speed slightly above idling speed, and a manually operated valve 132 located in the supply pipe 53 which delivers fluid under pressure from the reservoir 3 to the place of use closed, the engine may be started by a suitable starting mechanism (not shown). After the engine 2 has been started, the speed may be manually controlled by the rod 5 to warm up the engine.

When the engine 2 has run a sufficient length of time to be warmed up, the compressor 1 may be loaded by the operator rotating the lever 108 back to the position in which it is shown in FIG. 1 to release the rod 103 whereupon the spring 98 acting against the collar 95 moves the rod 96, link 101, and rod 103 in the direction of the left hand until the handle 107 engages the control panel 106. Movement of rod 103 in the direction of the left hand rocks the lever 104 and air inlet valve 8 in a counterclockwise direction until the valve 8 occupies a maximum open position.

With the compressor 1 loaded as explained above, the operator may increase the speed of the engine 2 to full speed by exerting an upward pull on handle 112 until the serrations 130 on the rod 5 will clear the single serration 131 in the control panel 106, to permit the spring 24 to expand and move the rods 15 and 5 in the direction of the right hand to rock arm 13 and the throttle valve of the carburetor 11 clockwise to full speed position in which a maximum amount of fuel-air mixture is admitted to the engine 2.

When the speed of engine 2 has increased to full speed, the operator may transfer the control of the engine and compressor to the compressor unit control device 4 by exerting a push on the handle 129 in the direction of the left hand to, through the Bowden wire 127 and lever 121, rock the locking key 116 clockwise back to the position in which it is shown in FIG. 2. When the locking key 116 is thus returned to the position in which it is shown in FIG. 2, manual control rod 5 is unlocked from the rod 15 and the speed of the engine 2 can no longer be controlled manually by the operator. With the manual control rod 5 unlocked from the rod 15, the speed of the engine 2 and the loading and unloading of compressor 1 will be automatically controlled by the controlled device 4 in accordance with the pressure of the compressed fluid in the reservoir 3 and the rate at which the compressed fluid flows from the reservoir to the place of use. This control operates in a manner that is now to be described.

As the fluid under pressure compressed by the compressor 1 is delivered to the storage reservoir 3, the pressure in the reservoir 3 and in the chamber 47 will increase. Since the valve 132 in the supply pipe 53, which delivers fluid under pressure from the reservoir 3 to the place of use, is closed, the pressure drop through choke 52 will be small and the pressure in chamber 50 will increase substantially simultaneously with the pressure in the reservoir and chamber 47. Therefore the pressures on opposite sides of the diaphragm 26 will be equal and opposite. The pressure in chamber 47 acts on the effective area of both diaphragm 25 and diaphragm 39, but, since the effective area of diaphragm 39 is greater than the effective area of diaphragm 25, the force developed to move the stem 40 in the direction of the left hand against the force of spring 63 will be greater than the force developed to move the stem 27 in the same direction. Therefore the stem 27 acts as a fulcrum for lever 56 and, when the pressure in chamber 47 increases sufficiently to overcome the force of spring 63, the diaphragm 39 will be deflected to move the stem 40 in the direction of the left hand to rock the lever 56 clockwise until the diaphragm follower 41 contacts a stop 133 formed on casing section 34 to prevent further movement of stem 40.

The characteristic of spring 63 is such that the pressure in chamber 47 must be increased to a chosen higher value, such as ninety (90) pounds per square inch, before sufficient force is developed on the two diaphragms 25 and 26 of unequal effective areas to move stem 27 in the direction of the left hand to rock lever 56 counterclockwise against the force of the spring. However, when compressor 1 has supplied sufficient fluid under pressure to the reservoir 3 to increase the pressure therein and in chambers 47 and 50 to the chosen higher value, such as ninety (90) pounds per square inch, this pressure acting on the effective area of diaphragm 25 will deflect the diaphragm and move the stem 27 in the direction of the left hand to rock lever 56 counterclockwise against the force of spring 63 about the stem 40 which now acts as the fulcrum for the lower end of the lever.

As the stem 27 moves in the direction of the left hand, its movement is transmitted through link 19a to the rod 19 and lever 91 to pull the rod 19 in the direction of the left hand and rock the lever 91 clockwise about pin 90. As the rod 19 is thus moved, it rocks arm 13 and the throttle valve of the carburetor 11 counterclockwise to reduce the speed of the engine 2 from full speed toward idling speed. As the lever 91 is rocked clockwise about pin 90, the roller 94 exerts a thrust on collar 95 to move rod 96 in the direction of the right hand to effect, through link 101, clockwise rocking of lever 104 and valve 8 to reduce the amount of air admitted to the inlet valve chamber of the compressor 1.

As the pressure in reservoir 3 and chambers 47 and 50 increases, the speed of the engine 2 and the opening of air inlet valve 8 will be reduced. Upon this pressure reaching a chosen higher value, such as one hundred (100) pounds per square inch, the arm 13 and the throttle valve of the carburetor will occupy an idling position in which the throttle valve contacts a stop (not shown) to prevent further counterclockwise rocking of the arm 13.

With the engine 2 operating at idling speed, the compressor 1 will continue to supply a reduced amount of fluid under pressure to the reservoir 3 to increase the pressure in the reservoir and in the chambers 47 and 50. As the pressure in these chambers increases, this pressure acting in chamber 47 on diaphragm 25 is effective to further deflect this diaphragm in the direction of the left hand to move stem 27, link 19a and rod 19 in the same direction until the resilient insert 87 in the left-hand end of stem 27 contacts unloader exhaust valve 88 whereupon further movement in this direction is resisted by the spring 80.

It should be understood that movement of the carburetor throttle valve past the idling position is prevented by the stop. Movement of rod 19 in the direction of the left hand under these circumstances will be permitted by piston 22 moving in the same direction within the sleeve 17 to compress the spring 23 while the sleeve 17, rod 15 and arm 13 remain stationary.

When the pressure in the reservoir 3 and chambers 47 and 50 increases to some chosen value above one hundred pounds per square inch, such as one hundred and five pounds per square inch, this pressure acting on diaphragm 25 is sufficient to overcome the resistance of spring 80 and deflect the diaphragm to further move the stem 27 in the direction of the left hand. As the stem 27 thus moves, it lifts valve 79 from its seat 73. When valve 79 is thus unseated, fluid under pressure flows from the main reservoir 3 through pipe 82 to chamber 81 and thence past the valve to chamber 83 from whence it flows through pipe 84 to the unloading mechanism of the compressor 1 to unload the compressor.

With the reservoir 3 charged to the chosen pressure of one hundred and five pounds per square inch, the compressor 1 unloaded, and the engine 2 operating at idling speed, let it be assumed that the operator opens the manually controlled valve 132 to permit fluid under pressure to flow from the reservoir 3 through the choked fitting 52, pipe 53 and the valve 132 to the place of use. Let it be further assumed that the size of choked fitting 52 is just sufficient to supply, at the pressure desired, the maximum quantity of fluid under pressure per minute necessary to operate the devices or tools located at the place of use. Furthermore, assume that this maximum quantity of fluid under pressure that may be delivered per minute through the choked fitting 52 to the place of use is less than the quantity of fluid under pressure delivered per minute to reservoir 3 by compressor 1 when engine 2 is running at full speed and the compressor operating at maximum capacity. Then the rate at which fluid under pressure is used from the reservoir 3 may vary from zero to this maximum rate, which is fixed by the size of the choked fitting 52 and will be determined by the speed of operation and load on these devices or tools using the compressed fluid.

As is well known, when the fluid under pressure flows through a restricted or choked fitting, the pressure on the downstream side of the fitting is always less than the pressure on the upstream side, and this difference in pressure between the upstream and downstream sides of the restriction is substantially directly proportional to the area of the choked opening and the rate or quantity of fluid flowing through the choke. Let it be assumed that, when the valve 132 is opened, the devices or tools located at the place of use of the fluid under pressure are operated at a speed less than their maximum speed and under a load less than maximum load. Therefore the rate of flow of fluid under pressure through choke fitting 52 is less than the maximum rate possible. However, this flow of fluid under pressure will cause a reduction in the pressures in reservoir 3 and chambers 47 and 50 at a corresponding rate. Consequently, due to the drop in pressure caused by flow through choked fitting 52, and the fact that fluid under pressure may flow unrestricted from chamber 50 through pipes 51 and 53 to the place of use, the pressure in chamber 50 will become less than and will reduce more rapidly than the pressure in chamber 47, the rate and degree of reduction in chamber 50 varying with the quantity of fluid under pressure delivered to the devices or tools located at the place of use. Therefore, when valve 132 is opened and fluid under pressure begins to flow from reservoir 3 to the place of use, the difference in the pressures in chambers 47 and 50 and acting on opposite sides of diaphragm 26, resulting from this fluid flow, reduces the force acting on stem 27 in the direction of the left hand in opposition to the force of spring 63 acting on the stem in the direction of the right hand. As the force acting in the direction of the left hand on stem 27 reduces in response to the use of fluid under pressure from reservoir 3, the force of spring 63 moves stem 27, link 19a, and rods 19 and 15 in the direction of the right hand to rock arm 13 and the throttle valve of carburetor 11 clockwise to increase the speed of engine 2.

Furthermore, as stem 27 is moved in the direction of the right hand, spring 80 acting on operating rod 78 of the unloading valve mechanism 70 maintains exhaust valve 88 formed on the right-hand end of sleeve 86 in contact with resilient insert 87 in the left-hand end of stem 27 until valve 79 seats on valve seat 73 to cut off communication between reservoir 3 and the compressor unloader. After valve 79 engages seat 73, further movement of stem 27 in the direction of the right hand moves resilient insert 87 out of contact with exhaust valve 88 whereupon the compressor unloader is vented to atmosphere through pipe 84, chamber 83, and bore 85 in sleeve 86, and the inlet valves of compressor 1 are no longer held in an open position to maintain the compressor 1 unloaded.

Movement of stem 27 in the direction of the right hand is transmitted through link 19a to rock lever 91 counterclockwise about pin 90. As lever 91 is thus rocked counterclockwise, roller 94 carried by the upper end of the lever is moved away from the collar 95 on the left-hand end of rod 96 to relieve the tension on spring 98. The spring 98 then expands to move rod 96 in the direction of the left hand and maintain collar 95 in contact with roller 94. Movement of rod 96 in the direction of the left hand is transmitted through link 101 to lever 104 to rock this lever and air inlet valve 8 counterclockwise to increase the opening of the valve and the amount of atmospheric air that may flow through inlet pipe 7 to the inlet valve chamber of the compressor 1 which is now loaded.

From the above it is apparent that the speed of engine 2 and the opening of air inlet valve 8 are increased, and the compressor 1 is loaded automatically in response to the rate of flow of fluid under pressure from reservoir 3 to the place of use.

After the compressor 1 is thus loaded, the fluid that is compressed by the compressor 1 is supplied to the reservoir 3 through pipe 9. However, at the time that the compressor 1 begins to supply fluid under pressure to the reservoir 3, fluid under pressure is still flowing from the reservoir to the place of use at a rate which is greater than the rate at which it is being supplied by the compressor since the speed of the engine has been increased only slightly above idling. Consequently, the pressures in chambers 47 and 50 will continue to reduce to increase the differential on diphragm 26 and further increase the speed of the engine 2 and the output of the compressor 1.

As hereinbefore mentioned, the characteristic of spring 63 is such that, with valve 132 closed, the chosen exemplary pressure of ninety pounds per square inch in chamber 47 is required before a sufficient force is developed on diaphragms 25 and 26 to reduce the speed of engine 2 below full speed. Therefore, if the reductions in the pressure in chambers 47 and 50 effected in response to the use of fluid under pressure from reservoir 3 were great enough to establish the same differential force on the diaphragms 25 and 26, the speed of the engine 2 would be increased to full speed. However, the limited rate of flow of fluid under pressure from reservoir 3 through choke fitting 52 to the place of use is not great enough to provide the differential force required to increase the speed of engine 2 to full speed, but will provide a differential force sufficient to automatically increase the speed of the engine 2 proportional to this rate of flow. As a consequence of this increase in the speed of the engine, the output of the compressor 1 will be increased and when the output has been increased until the quantity of fluid under pressure supplied per minute to the reservoir 3 is the same as the quantity per minute that flows from the reservoir to the place of use, there will be no further reduction in the pressures in the reservoir and in chambers 47 and 50 to effect a further increase in the speed of the engine 2. Consequently, when the speed of the engine and the output of the compressor have been increased sufficiently to establish this state of equilibrium, there will be no further change in the speed of the engine as long as the rate of use of fluid under pressure from the reservoir remains constant.

Now let it be assumed that the speed of, and the load on the devices or tools located at the place of use of the fluid under pressure are reduced. This reduction in speed and load reduces the quantity of fluid under pressure per minute necessary to operate the devices or tools and consequently the rate of flow of fluid under pressure from reservoir 3 through choked fitting 52 to the place of use. When the rate of flow is thus reduced, the quantity of fluid under pressure flowing from the reservoir per minute will be less than the quantity per minute supplied to the reservoir by the compressor 1. Therefore the quantity of fluid under pressure supplied to the reservoir in excess of the quantity withdrawn from the reservoir will effect an increase in the pressure in the reservoir, in chambers 47 and 50 and in pipe 53. It should be noted, however, that the pressure in chamber 50 will not become equal to the pressure in chamber 47 due to the pressure drop across choked fitting 52. Consequently, the pressure in chamber 47 will still exceed the pressure in chamber 50 but the difference in these two pressures decreases as these pressures increase in response to the supply from the compressor to the reservoir exceeding the demand for fluid under pressure at the place of use. As the difference in the pressure in chambers 47 and 50 decerases, the force on stem 27 acting in the direction of the left hand increases to overcome the force of spring 63 and moves stem 27, link 19a, and rods 19 and 15 in the direction of the left hand rock arm 13 and the throttle valve of carburetor 11 counterclockwise to decrease the speed of engine 2 and the output of compressor 1. The speed of engine 2 and the output of compressor 1 will be reduced, as just explained, until the output of the compressor is just equal to the demand for fluid pressure at the place of use. When this condition of equilibrium is reached, there will be no further change in the pressures in reservoir 3, chambers 47 and 50, and pipe 53 as long as the rate of use of fluid under pressure from the reservoir remains constant.

It may now be assumed that the speed of, and the load on the devices or tools located at the place of use of fluid under pressure are increased until the devices or tools are operating at their maximum speed and under maximum load. This increase in speed and load increases the quantity of fluid under pressure per minute necessary to operate the devices or tools and consequently the rate of flow of fluid under pressure from reservoir 3 through choke fitting 52 to the place of use. The quantity of fluid under pressure per minute now necessary to operate the devices or tools located at the place of use of the fluid under pressure exceeds the quantity per minute supplied to reservoir 3 by compressor 1.

At the time the demand for fluid under pressure begins to increase, there will be a rapid reduction in the pressures in reservoir 3 and chambers 47 and 50. However, as hereinbefore explained, the pressure in chamber 50 will reduce more rapidly than the pressure in chamber 47. Therefore, as a consequence of the difference in the resulting pressures in chambers 47 and 50, the force acting on stem 27 in the direction of the left hand in opposition to the force of spring 63 is reduced, and the force of spring 63 moves stem 27, link 19a, and rods 19 and 15 in the direction of the right hand to rock arm 13 and the throttle valve or carburetor 11 clockwise to increase the speed of engine 2 and consequently the output of compressor 1.

As hereinbefore explained, when the output of the compressor has been increased until the quantity of fluid under pressure supplied to the reservoir is equal to the quantity that flows from the reservoir to the place of use, there will be no further reduction in the pressure in the reservoir and in chambers 47 and 50 to further increase the speed of the engine. Therefore, when the speed of the engine and the output of the compressor have been increased until the compressor is delivering to the reservoir the quantity of fluid under pressure necessary to operate the devices or tools located at the place of use at their maximum speed and under maximum load, the engine will continue to run at this speed until the rate of use of fluid under pressure from the reservoir is changed.

It may be noted that the speed at which the engine is now running is less than full speed since it was assumed that the maximum quantity of fluid under pressure necessary to operate the devices or tools at full speed and under full load is less than the output of the compressor when the engine is running at full speed. Therefore, racing of the engine at full speed and the resulting excessive wear on the engine is prevented.

*Description—FIGS. 5 and 6*

The engine driven compressor unit shown in FIG. 5 is generally similar to that shown in FIG. 1, except the compressor unloader control valve 70 of the compressor unit control device 4 shown in FIG. 1 is omitted from the control device shown in FIG. 5 and suitable manually and automatically controlled mechanical linkages are provided to hold open the compressor inlet valve to unload the compressor, the automatic controlled mechanical linkage being operatively connected to the control device. Other elements in these figures which are the counterparts of elements in FIGS. 1 to 4 are identified by the same reference characters as in FIGS. 1 to 4 without further description. The locking mechanism for locking the manual control rod 5 to the operating arm 13 of carburetor 11 differs somewhat from that shown in FIGS. 1 to 4 chiefly in the details of the structure whereby the rod 5 is normally spring biased out of locking engagement with the arm 13.

The compressor unit shown in FIG. 5 comprises, in addition to the compressor 1, internal combustion engine 2, reservoir 3, compressor unit control device 4 and manual control rod 5, a T-shaped lever 134 pivotally mounted at the joint of the T by means of a pin 135 on a pair of lugs 136, only one of which is shown in FIG. 5, secured, as by welding, to the frame of compressor 1. A first arm of the T-shaped lever 134 is connected by link 19a and pins 137 and 138 to stem 27 of governor 4, and a second arm of the lever opposite the first arm is connected to rod 19 by a pin 139, these arms thus cooperating with link 19a to operatively connect governor 4 to rod 19 and hence to the throttle valve of carburetor 11.

The third arm of T-shaped lever 134 is connected, as by a pin 140, to one end of a link 141 the opposite end of which is connected by a pin 142 to one arm of a bellcrank lever 143. Bellcrank lever 143 is pivoted at its knee, as by a pin 144, on a pair of lugs 145, only one of which is shown, secured, as by welding, to the top head of the compressor. The other arm of bellcrank lever 143 is bifurcated and carries a roller 146 which may contact a collar 147 carried on the left-hand end of an unloading control rod 148. The rod 148 is operatively connected, adjacent collar 147, to the air inlet control lever 104, as by means of a pin 149, to permit control of the position of air inlet valve 8 within intake pipe 7.

In order to provide for manual control of the position of air inlet valve 8, the right-hand end of lever 148 extends through control panel 106 and is provided with a handle 150 by which the operator may move rod 148 in the direction of the right hand against the force of a spring 151 surrounding rod 148 and disposed between control panel 106 and a collar 152 rigidly secured to the rod.

The compressor 1 is provided with an unloading valve 153 for constantly opening a low pressure compressing chamber 154 to atmosphere when the valve is held out of contact with a seat 155 formed on the top head of the compressor 1. Valve 153 is normally biased against seat 155 by a spring 156 disposed between a collar 157 secured to the fluted stem of the valve and the top head of the compressor. To unload the compressor 1, the valve 153 is adapted to be unseated against the force of spring 156 by one arm 158 of a bellcrank lever 159 pivotally mounted at its knee, as by means of a pin 160, on a pair of lugs 161, only one of which is shown in FIG. 5, secured as by welding, to the top head of the compressor. Another arm 162 of bellcrank 159 carries, adjacent its outer end, a pin 163 which, when rod 148 is moved a chosen distance in the direction of the right hand, from the position in which it is shown in FIG. 5, contacts the left-hand end of a recess 164 formed on the bottom side of the rod. After the left-hand end of recess 164 contacts pin 163, additional movement of rod 148 in the direction of the right hand rocks bellcrank 159 clockwise about pin 160 to unseat valve 153 and unload the compressor.

From the above, it is apparent that operation of valve 153 to unload the compressor 1 may be automatically controlled by the compressor unit control device 4 or the valve 153 may be manually opened and locked in open position by the operator to maintain the compressor unloaded.

A manually operated locking mechanism 165 shown in FIGS. 5 and 6 for connecting the manual control rod 5 to the carburetor throttle valve operating arm 13 comprises a rod 166 pivotally connected at its left-hand end to arm 13 intermediate its ends by a pin 167 and a pair of locking arms 168 operatively connected to rod 5. The left-hand end of rod 5 extends into the right-hand end of a hollow sleeve 169 and is secured to the sleeve by a pin 170. The pin 170 also extends through the opposite fingers of a clevis 171 formed on the right-hand end of the lower arm 168 and the opposite fingers of a clevis 172 formed on the same end of the upper arm 168. Each arm 168 is provided, adjacent the end opposite the end having the clevis, with a notch or groove 173 for interlocking engagement with one of two arms 174 extending in opposite directions from and at right angles to rod 166, the right-hand end of which is slidably operable within the hollow sleeve 169. The arms 168 are normally biased out of interlocking engagement with the arms 174 by a double U-shaped wire spring 174a. Spring 174a is anchored to hollow sleeve 169 by means of two ears or projections 175, only one of which is shown in FIG. 5, extending in diametrically opposite directions from the outer periphery of sleeve 169 and each passing through one of two oppositely arranged loops 176 formed in the spring.

The arms 168 are rockable into interlocking engagement with arms 174 on rod 166 by means of a ring 177 surrounding the pivoted ends of these arms and manually movable by a Bowden wire 178, one of which extends through a bore in a lug 179 formed on the ring 177. Wire 178 is secured to the lug 179 by a set screw 180. Bowden wire 178 extends through support 128 and panel 106 and carries on its opposite end a handle 181 to permit the operator to control locking and unlocking of manual control rod 5 with rod 166 by pushing or pulling on the Bowden wire.

*Operation*

The operation of the engine driven compressor unit shown in FIG. 5 is identical with the operation of the unit shown in FIG. 1 except the opening and holding open of the compressor inlet valve 153 to unload the compressor 1 is effected by a mechanical linkage operated either automatically by the compressor unit control device 4 or manually by the operator of the unit.

*Description—FIGS. 7 to 10*

There is shown in FIGS. 7 to 10 a third embodiment of an automatically operative control device 182. The control device 182 is generally similar in function to the automatic engine governing and compressor unloading control device 4 shown in FIG. 1 but differs therefrom in certain details of structure and operation. The control device 182 is adapted to be operatively connected to a fuel control governor, such as that shown on Page 14, Section 2 of Detroit Diesel Series 71 Operator's Manual, published by Detroit Diesel Engine Division of General Motors Corporation, to control the operation thereof, and thereby the fuel supply and speed of an internal combustion engine, such as a two-cycle diesel engine manufactured by the Detroit Diesel Engine Division of the General Motors Corporation, and also described in this manual.

The automatically operative control device 182 comprises two coaxially related diaphragms 183 and 184 of unequal area mounted on a common hollow stem 185 and spaced apart by two shoulders 186 and 187 formed on said stem. The central portion of the diaphragm 183 is clamped between a pair of diaphragm followers 188 one of which rests against the shoulder 186 and the other of which is forced against the diaphragm 183 by a nut 189 having screw-threaded engagement with the stem 185. The central portion of the diaphragm 184 is clamped between a pair of diaphragm followers 190 one of which rests against the shoulder 187 and the other of which is forced against the diaphragm 184 by a nut 191 having screw-threaded engagement with the stem 185. The diaphragm 183 is clamped around its outer edge between two casing sections 192 and 193, and the diaphragm 184 is clamped around its outer edge between the casing section 193 and a third casing section 194.

The hollow stem 185 and diaphragms 183 and 184 are mounted for limited movement in an axial direction within the control device 182 by having the right-hand end of hollow stem 185 slidably mounted in a bore 195 formed in the center of casing section 194 and the left-hand end of the stem slidably mounted in a bore 196 formed in the casing section 192. The right-hand end of the hollow stem 185 extends to the exterior of the casing section 194 and is provided with internal screw-threads for receiving a threaded stud formed on the left-hand end of a collar member 197. The collar member 197 is provided with an O-ring seal 198 which is disposed in an annular recess formed in the right-hand end of hollow stem 185, said O-ring serving to prevent leakage of fluid under pressure from the interior of hollow stem 185.

The left-hand end of the hollow stem 185 extends to the exterior of the casing section 192 and has mounted thereon a piston 199 which is clamped between a shoulder 200 formed on the stem 185 adjacent its left-hand end and a nut 201 having screw-threaded engagement with said stem.

The piston 199 is slidably operable in a cylinder 202 having a non-pressure head 203 through which extends the hollow stem 185, the end of said stem terminating in a chamber 204 formed between the piston 199 and a pressure head 205 of the cylinder.

A spring 206, interposed between the piston 199 and the non-pressure head 203, serves to yieldingly bias the cylinder 202 to a position in which the piston 199 rests against a stop shoulder 207 formed at the left-hand end of a bore 208 in the cylinder 202.

Formed on the pressure head 205 is a clevis 209 to which is connected, as by a pin 210, one end of a link 211, the opposite end of which is provided with an elongated slot 212. The link 211 is operatively connected to a clevis 213 formed at one end of a lever 214, as by a pin 215. The lever 214 is suitably fulcrummed intermediate its ends on a pin 216 carried by the opposite fingers of a clevis 217 formed at one end of an arm 218 extending outwardly from and formed integral with the casing section 192. The opposite end of the lever 214 is operatively connected to one end of a link 219, as by a pin 219a. The other end of the link 219 is operatively connected to a fuel control governor, such as the hereinbefore-mentioned General Motors Corporation governor. This fuel control governor is provided with a spring (not shown) which is effective through the link 219 to always bias the lever 214 in a clockwise direction toward a maximum speed position and the pin 215 in the direction of the right-hand end of the slot 212 except when the governor is manually operated at which time the slot 212 permits manual control of the governor to be entirely independent of and in no way affected by the automatically operative control device 182. The lever 214 may be operatively connected intermediate its ends by means of a link 219b to a lever, such as the lever 91 shown in FIG. 1, to permit automatic control of a compressor air intake control valve, such as the air intake control valve 8 also shown in FIG. 1, by the automatically operative control device 182.

The diaphragms 183 and 184 cooperate with the casing section 193 to form a chamber 220 which may be connected to the storage reservoir 3 shown in FIG. 1 by such as the pipe 48 shown in said figure.

The diaphragm 184 and the casing section 194 cooperate to form a chamber 221 which may be connected, as by the pipe 51 shown in FIG. 1, to the outlet side of the choked fitting 52 also shown in said figure.

The diaphragm 183 cooperates with the casing section 192 to form a chamber 222 to which fluid under pressure may be supplied from the chamber 220 under the control of a cut-off valve mechanism 223 which will now be described in detail.

As shown in FIG. 9, the casing section 192 is provided with a bore 224 and three coaxial counterbores 225, 226, and 226a of unequal diameter. An O-ring seal 227 rests against an annular shoulder formed at the right-hand end of the counterbore 225 to provide a seal between the interior of said counterbore, which is connected by a passageway 228 to the chamber 222, and atmosphere. A spring seat 229 in the form of a hollow ring rests against the O-ring seal 227.

Slidably mounted in the counterbore 225 is a hollow piston valve member 230 having extending from the opposite faces thereof hollow reduced cylindrical portions 231 and 232. The hollow reduced cylindrical portion 231 extends through the hollow spring seat 229 and the O-ring 227 into the bore 224 which acts as a guide for said portion and the piston valve member 230.

Surrounding the cylindrical portion 231 and disposed between the spring seat 229 and the right-hand face of the piston valve member 230 is a spring 233 for biasing the piston valve member 230 in the direction of an annular disc-type valve seat 234 which rests against an annular shoulder formed at the right-hand end of the counterbore 226a. The valve seat 234 is provided on one side with a resilient insert 235 and is retained in place by a plurality of radially spaced fingers 236 extending outward from the right-hand face of a hollow screw plug 237 which closes the open end of counterbore 226a by having screw-threaded engagement with the casing section 192.

The right-hand face of the valve seat 234 cooperates with the wall of counterbore 226 to form a chamber 238 which is constantly in communication with the chamber 220 through a passageway 239 extending through the casing sections 192 and 193.

The hollow reduced cylindrical portion 232 of the piston valve 230 extends with clearance through the valve seat 234 and the screw plug 237 into a chamber 240 where it contacts the right-hand side of a diaphragm 241 clamped between the casing section 192 and a spring housing 242 secured to said casing section as by bolts (not shown). The chamber 240 is connected to the chamber 222 through the hollow screw plug 237, the space between the fingers 236 of said plug, and a passageway 243 formed in the casing section 192 to constantly subject the right-hand face of the diaphragm 241 to the pressure in chamber 222.

The spring housing 242 contains a spring 244 which is disposed between a diaphragm follower 245 in engagement with the left-hand face of the diaphragm 241, and a spring seat 246 also located within the housing. The spring 244 acting through the diaphragm follower 245 biases the diaphragm 241 against the end of the ho cylindrical reduced portion 232 of the piston valve 230 to move said valve in the direction of the right hand against the force of the spring 233 to an open position until the pressure in the chambers 220, 222 and 240 is sufficient to overcome the force of the spring 244.

In order to provide for adjusting the tension on the spring 244, the spring seat 246 has a cone-shaped notch formed on its left-hand face to receive the end of an adjusting screw 247 which has screw-threaded engagement with a threaded bore 248 in the spring housing 242. A lock nut 249 is provided on the adjusting screw 247 to lock said screw in any chosen adjusted position.

Located within the casing section 194 is a fluid actuated control valve mechanism 250 for supplying fluid under pressure from the chamber 220 and the main reservoir 3, which may be connected thereto by the pipe 48 as hereinbefore mentioned, to the unloading mechanism (not shown) of the compressor 1 in response to the pressure of the fluid compressed by the compressor and stored in the reservoir 3 reaching a chosen high value.

As shown in FIG. 10, the casing section 194 is provided with a bore 251 and three coaxial counterbores 252, 253 and 254. A disc-type valve seat 255 having a resilient insert 256 rests against an annular shoulder formed at the left-hand end of the counterbore 254. A bushing 257 having an O-ring seal 258 is disposed in the right-hand end of the counterbore 254 with the left-hand end of the bushing contacting the valve seat 255. The bushing 257 is retained in place by a screw plug 259 having screw-threaded engagement with the casing section 194. An O-ring seal 260 surrounds the bushing 257 and is retained in place against the casing section 194 by the screw plug 259, said seal serving to prevent leakage of fluid under pressure along the periphery of the bushing from a passageway 261, formed in the casing section 194, to atmosphere. The passageway 261 is connected at one end to a chamber 262 within the bushing 257 through a plurality of radial ports 263 in the bushing, and at the other end to a chamber 264 (FIG. 7) formed in the casing section 194 and disposed in surrounding relation to a portion of the hollow stem 185.

The chamber 264 is open to the interior of the hollow stem 185 through a plurality of radial ports 265 is said stem and through a pipe 266 to the unloading mechanism of the compressor 1.

Slidably mounted in the counterbore 252 is a hollow piston valve member 267 having extending from the opposite faces thereof hollow reduced cylindrical portions 268 and 269. Surrounding the reduced cylindrical portion 268 is an O-ring seal 270 which rests against an annular shoulder formed at the left-hand end of the counterbore 252. An annular spring seat 271 rests against the O-ring seal 270 and disposed between this spring seat 271 and the left-hand face of the piston valve member 267 is a spring 272 for biasing the piston valve member 267 into contact with the resilient insert 256 of the valve seat 255 to close communication between the chamber 262 and the interior of the counterbore 253 which is connected to the chamber 220 by a passageway 273 formed in the casing sections 194 and 193.

The hollow reduced cylindrical portion 269 extends through the valve seat 255 and into the chamber 262 in which is disposed an operating plunger 274. The operating plunger 274 is normally biased against an inturned flange formed on the right-hand end of the bushing 257 by a spring 275 disposed between a collar 276 formed on said plunger and the valve seat 255. In this position of the plunger 274 a resilient insert 277 provided on the left-hand face of the plunger is spaced a short distance away from the right-hand end of the reduced portion 269 of piston valve member 267 to provide a communication between the chamber 262 and atmosphere through the hollow piston valve member 267, the bore 251, and a passageway 278 formed in the casing section 194 and connecting the bore 251 to the exterior of the casing section, said communication serving to vent the compressor unloader. Plunger 274 has an operating stem 281 extending from its right-hand face through a bore 279 in the bushing 257, the O-ring seal 258 carried by said bushing, and a bore 280 in screw plug 259, to the exterior of the casing.

As shown in FIGS. 7 and 8, the control valve mechanism 250 is operated by a stud 282 coaxial with the stem 281 and having screw-threaded engagement with an arm 283. The arm 283 is pivotally mounted on a pin 284 extending through a pair of lugs 285 formed integral with the casing section 194. The arm 283 is provided with a yoke 286 which fits around the hollow stem 185 exteriorly of the casing section and between the casing section and the collar member 197. When the stem 185 is moved in the direction of the left hand, in response to the pressure in the reservoir 3 and chamber 220 reaching the hereinbefore-mentioned high value, the collar member 197 first contacts the yoke 286 of arm 283 and rocks this arm about pin 284 to bring stud 282 into contact with the stem 281 of the plunger 274. Further movement of the stem 185 in the direction of the left hand will move the plunger 274 into contact with the end of reduced portion 269 of piston valve member 267 to close communication between the unloader and atmosphere. As the stem 185 continues to move in the direction of the left hand, the piston valve member 267 will be unseated from its seat 255 to permit the flow of fluid under pressure from the reservoir 3 to the unloader to unload the compressor.

*Operation*

In operation, let it be assumed that the control device 182 is connected to a fuel cotrol means hereafter referred to as a fuel control governor, such as the hereinbefore-mentioned General Motors Corporation governor, for the engine of an engine-driven compressor unit. Also let it be assumed that this compressor unit is substantially the same as the compressor unit shown in FIG. 1 except the internal combustion engine 2 shown in FIG. 1 is replaced by an engine, such as the hereinbefore-mentioned two-cycle diesel engine manufactured by the Detroit Diesel Engine Division of the General Motors Corporation. Let it be further assumed that the engine and compressor are stopped, and reservoir 3, chamber 220, chamber 221, chamber 222, and chamber 240 are all at atmospheric pressure. In the absence of fluid under pressure in chambers 220, 221 and 222, the spring in the fuel control governor adjusts the governor to provide for the engine to operate at its maximum speed, and also, acting through the link 219 and lever 214, biases the stem 185 and diaphragms 183 and 184 to the position in which they are shown in FIG. 7 in which the right-hand diaphragm follower 190 contacts the casing section 194. In this position the spring 206 will bias the stop 207 in cylinder 202 into contact with the piston 199 mounted on the stem 185 since the chamber 204 is vented to atmosphere through the interior of hollow stem 185, radial ports 265 in the stem, chamber 264, passageway 261, radial ports 263 in bushing 257, chamber 262, the interior of hollow piston valve member 267, bore 251, and passageway 278.

Let it be further assumed that the compressor 1 is partly unloaded by the operator exerting a pull on the handle 107 to move the rod 103 and air inlet valve 8 to a position in which said inlet valve occupies its minimum open position and then locking the rod 103 and valve 8 in this position by means of short lever 108 as has been hereinbefore explained in connection with the embodiment of the invention shown in FIG. 1.

Also assume that the locking mechanism 6 is operated to lock the manual control rod 5 to the link 219 instead of the rod 15 as hereinbefore explained in connection with the embodiment shown in FIG. 1. Further assume that the operator now, by exerting a pull on the handle 112 and rod 5 in the direction of the right hand, changes the setting of the fuel control governor from the full speed position to a position in which the diesel engine will operate at a speed slightly above a fast idling speed.

It will be noted that, since the pin 215 may move within the slot 212 in the link 211 in the direction of the left hand, as the manual throttle control rod 5 is moved in the direction of the right hand, no movement will be imparted through the manual control rod 5, locking mechanism 6, link 219 and lever 214 to the stem 185 of the control device 182. Therefore, when the control rod 5 has been moved to the position to set the fuel control governor to operate the diesel engine at a speed slightly above the fast idling speed, the rod 5 may be locked in this position as hereinbefore explained in connection with FIG. 1.

With the compressor 1 unloaded, the reservoir 3 and chambers 220, 221, 222 and 240 at atmospheric pressure, the control rod 5 in a position to operate the diesel engine at a speed slightly above fast idling speed, and the manually operated valve 132 located in the supply pipe 53 shown in FIG. 1 closed, the diesel engine may be started by any suitable starting mechanism (not shown). After the diesel engine has been started, the speed may be manually controlled by the rod 5 until the engine has warmed up.

When the diesel engine has run a sufficient length of time to be warmed up, the compressor 1 may be loaded by the operator rotating the lever 108 back to the position in which it is shown in FIG. 1 to release the rod 103 whereupon the spring 98 will rock the lever 104 and air inlet valve 8 in a counterclockwise direction to a maximum air inlet valve opening position.

With the compressor 1 loaded as explained above, the operator may manually increase the speed of the diesel engine to full speed and then transfer the control of the engine and the compressor 1 to the control device 182 by following substantially the same procedure hereinbefore described in connection with the embodiment shown in FIG. 1.

As the fluid under pressure compressed by the compressor 1 is delivered to the storage reservoir 3, the pressure therein and in the chamber 220 will increase. Since the chamber 220 is connected to the chamber 222 through the cut-off valve mechanism 223 until the pressure in the chamber 240 is increased sufficiently to deflect diaphragm 241, against the spring 244, the pressure in the chamber 222 will increase simultaneously with the pressure in the chambers 220 and 240 until the cut-off valve mechanism 223 operates to close communication between the chambers 220 and 222 and trap the fluid under pressure present in the chamber 222.

Since the valve 132 in the supply pipe 53, which delivers fluid under pressure from the reservoir 3 to the place of use, is closed, the pressure drop through choke 52 will be small and the pressure in chamber 221 will increase substantially simultaneously with the pressure in the reservoir 3 and the chamber 220. Therefore, the pressures on opposite sides of the diaphragm 184 will be equal and opposite.

With the pressure on the opposite sides of both diaphragm 183 and diaphragm 184 equal and increasing at the same rate in response to the fluid under pressure supplied to the reservoir 3 by the compressor 1, these diaphragms and the stem 185 will remain in the position in which they are shown in FIG. 7 until the pressure in chambers 220, 221, 222 and 240 has increased sufficiently to overcome the force of the spring 244 acting on one side of the diaphragm 241 and deflect diaphragm 241 in the direction of the left hand against the opposing force of the spring 244. As the pressure in chamber 240 (FIG. 9) increases to deflect diaphragm 241 in the direction of the left hand, the spring 233 will move the piston valve 230 in the direction of the left hand until the valve 230 seats on the annular valve seat 234 and closes communication between chamber 220 and chambers 240 and 222 to prevent a further increase in the pressure in chambers 222 and 240 unless leakage occurs between the valve 230 and its seat 234.

It may be noted at this point that if leakage of fluid under pressure occurs between the valve 230 and its seat 234, the pressure in chamber 240 will increase and further deflect the diaphragm 241 in the direction of the left hand against the opposing force of the spring 244. As the diaphragm 241 is thus deflected in the direction of the left hand, the central portion of this diaphragm moves out of contact with the end of the cylindrical portion 232 of the hollow piston valve 230 to permit fluid under pressure to flow from chambers 240 and 222 through the interior of piston valve 230 and bore 224 to atmosphere. Therefore, the pressure in the chambers 240 and 222 will remain substantially constant after the piston valve 230 seats on its seat 234 even if leakage does occur between the valve and its seat.

After the piston valve 230 has seated on its seat 234 there will be substantially no further supply of fluid under pressure to the chamber 222 as the compressor 1 continues to supply fluid under pressure to the reservoir 3 to cause the pressure therein and in the chambers 220 and 221 to increase above the trapped pressure in the chamber 222.

The characteristic of the spring 244 is such that the pressure in the chambers 220, 221, 222 and 240 must be increased to a chosen high value, such as ninety (90) pounds per square inch and selectively determined by the position of the adjusting screw 247 relative to the spring housing 242, before a sufficient force is developed in chamber 240 to deflect diaphragm 241 to permit spring 233 to close valve 230. After the valve 230 closes, a further increase in pressure in chambers 220 and 221 and on the two diaphragms 183 and 184 is effective to move the stem 185 in the direction of the left hand against the opposing force of the trapped pressure in chamber 222. However, as the compressor 1 supplies additional fluid under pressure to the reservoir 3 to increase the pressure therein and in chambers 220 and 221 above the chosen high value, such as ninety (90) pounds per square inch, this increasing pressure acting on the effective area of diaphragm 183 will deflect this diaphragm against the opposing trapped pressure in the chamber 222 to increase the pressure in chambers 222 and 240 and move the stem 185 and cylinder 202 carried thereby in the direction of the left hand to rock the lever 214 counterclockwise about the pin 216.

As the pressure in chambers 222 and 240 thus tends to increase, the diaphragm 241 is deflected away from the left-hand end of hollow cylindrical portion 231 to permit fluid under pressure to flow to atmosphere until the pressure in these chambers is reduced to ninety (90) pounds per square inch. Consequently, the pressure in these chambers remains constant.

As the lever 214 is thus rocked counterclockwise, its movement is transmitted through link 219 to the fuel control governor and through a link 219b to the lever 91. The setting of the fuel control governor is thus changed to reduce the speed of the engine 2 from full speed toward the fast idling speed. As the lever 91 is rocked about a fixed pivot pin corresponding to the pin 90 (FIG. 1), the roller 94 exerts a thrust on collar 95 to move rod 96 and link 101 to rock lever 104 and air inlet valve 8 toward an almost minimum open position in which the amount of air admitted to the inlet valve chamber of the compressor 1 is reduced to a low value.

As the pressure in reservoir 3 and chambers 220 and 221 increases, the speed setting of the fuel control governor and the opening of air inlet valve 8 will continue to be reduced. Upon this pressure reaching a chosen higher value, such as one hundred (100) pounds per square inch, the fuel control governor will be set in the position in which the engine will operate at its fast idling speed and the air inlet valve 8 will occupy the almost minimum open position.

With the diesel engine operating at the fast idling speed, the compressor will continue to supply a reduced amount of fluid under pressure to the reservoir 3 to increase the pressure in the reservoir and in the chambers 220 and 221. As the pressure in these chambers increases, this pressure acting in chamber 220 on diaphragm 183 is effective to further deflect this diaphragm in the direction of the left hand against the opposing constant trapped pressure in chamber 222 to move the stem 185 in the same direction until the collar member 197 on the stem 185 contacts the yoke 286 of the arm 283 whereupon further movement in this direction rocks arm 283 about pin 284 (FIG. 8).

When the pressure in the reservoir 3 and chambers 220 and 221 increases to some chosen value above one hundred pounds per square inch, such as one hundred and five pounds per square inch, this pressure acting on diaphragm 183 is sufficient to further deflect this diaphragm against the opposing constant trapped pressure in the chamber 222 and move the stem 185 in the direction of the left hand. As the stem 185 thus moves, it rocks the arm 283 to a position in which the stud 282 carried by the arm first contacts the operating stem 281 (FIG. 10) of the control valve mechanism 250 and then moves the plunger 274 in the direction of the left hand into contact with the reduced portion 269 of hollow piston valve 267 to close communication between the chamber 262 and atmosphere. Further movement of the stem 185 continues the rocking of the arm 283 whereupon the plunger 274 and the piston valve 267 are both moved in the direction of the left hand to unseat the piston valve 267 from its seat 255. When the piston valve 267 is thus unseated, fluid under pressure flows from the reservoir 3 through the pipe 48 to the chamber 220, thence through the passageway 273 to the interior of counterbore 253 and thence past the now open piston valve 267 to the chamber 262 from whence it flows through radial ports 263 to the passageway 261 which leads to the chamber 264. The fluid under pressure thus supplied to the chamber 264 will flow from this chamber through the pipe 266 to the unloading mechanism of the compressor 1 to unload the compressor.

Fluid under pressure supplied to the chamber 264 will also flow through the radial ports 265 in the hollow stem 185 to the interior thereof and thence to the chamber 204 in the shut-down cylinder 202. Fluid under pressure thus supplied to the chamber 204 formed between the piston 199 and the pressure head 205 of the cylinder 202 is effective to move the cylinder 202 with respect to the piston 199 which is anchored against movement by being secured to the hollow stem 185 as previously described. As the cylinder 202 is thus moved in the direction of the left hand relative to the stem 185, it will effect, through the link 211, counterclockwise rocking of the lever 214 about the pin 216.

As the lever 214 is thus rocked counterclockwise, its movement is transmitted through the link 219 to the fuel control governor and lever 91. As the link 219 is thus moved, the fuel control governor will be set to a slow idling position in which the fuel-air mixture supplied to the diesel engine is reduced to an amount just sufficient to operate the engine-compressor unit with the compressor 1 unloaded.

When the lever 91 is rocked about the fixed pivot pin corresponding to the pin 90 (FIG. 1) by the link 219, the roller 94 acting through rod 96 and link 101 rocks lever 104 and the air inlet valve 8 to the minimum open position of said valve in which the amount of air admitted to the inlet valve chamber of the compressor 1 is further reduced to a very low value which is less than the hereinbefore-mentioned low value.

With the reservoir 3 charged to the chosen pressure of one hundred and five (105) pounds per square inch, the compressor 1 unloaded, and the diesel engine operating at its slow idling speed, let it be assumed that the operator opens the manually controlled valve 132 to permit fluid under pressure to flow from the reservoir 3 through the choked fitting 52, pipe 53 and the valve 132 to the place of use. Let it also be assumed that, when the valve 132 is opened, the devices located at the place of use of the fluid under pressure are operated at a speed less than their maximum speed and under a load less than maximum load. Therefore, the rate of flow of fluid under pressure through choke fitting 52 is less than the maximum rate possible. However, this flow of fluid under pressure will cause a reduction in the pressures in the reservoir 3 and chambers 220 and 221 at a corresponding rate. Consequently, due to the drop in pressure caused by the flow through the choked fitting 52, and the fact that fluid under pressure may flow unrestricted from chamber 221 to the place of use, the pressure in chamber 221 will become less than and will reduce more rapidly than the pressure in the chamber 220, the rate and degree of reduction in chamber 221 varying with the quantity of fluid under pressure delivered to the devices located at the place of use. Therefore, when fluid under pressure begins to flow from the reservoir 3 to the place of use, with consequent reduction of fluid pressure in chamber 221, the resulting difference in the pressures in chambers 220 and 221 acting on opposite sides of diaphragm 184 reduces the force acting on the stem 185 in the direction of the left hand. As the force acting in the direction of the left hand on stem 185 reduces, as just explained, the opposing force of the spring in the fuel control governor and the force of the trapped fluid under pressure in the chamber 222 moves the stem 185 in the direction of the right hand. As the stem 185 moves in the direction of the right hand, the collar member 197 will be moved away from yoke 286 whereupon the control valve mechanism 250 will operate to vent fluid under pressure from the unloading mechanism of the compressor 1 to load the compressor and from the chamber 204 in cylinder 202.

As fluid under pressure is vented from the chamber 204 by the control valve mechanism 250, the spring 206 acting between the piston 199 and the non-pressure head 203 moves the cylinder 202 relative to the piston 199 and stem 185 until the stop 207 formed at the left-hand end of the bore 208 in the cylinder 202 contacts the piston 199.

As the cylinder 202 is moved in the direction of the right hand relative to the piston 199 and stem 185 by the spring 206, the spring in the fuel control governor, acting through link 219, rocks the lever 214 clockwise about the pin 216 to maintain pin 215 in contact with the right-hand end of the slot 212 in the link 211. As the lever 214 is thus rocked clockwise by the spring in the fuel control governor, the setting of the fuel control governor is changed from slow idling to fast idling to slightly increase the speed of the engine 2.

Movement of the link 219 is also effective to rock the lever 91 about the fixed pivot pin corresponding to the pin 90 to move the roller 94 (FIG. 1) away from the collar 95 whereupon the spring 98 expands to move the rod 96 to maintain the collar 95 in contact with the roller 94. The movement of the rod 96 is transmitted through the link 101 to the lever 104 to rock this lever and the air inlet valve 8 from the hereinbefore-mentioned minimum open position to the almost minimum open position to slightly increase the volume of atmospheric air that is admitted to the inlet valve chamber of the compressor 1.

After the stop 207 at the left-hand end of the bore 208 in the cylinder 202 contacts the piston 199 carried by the stem 185, the cylinder 202 will be moved in the direction of the right hand along with the stem 185 which is being moved in this direction in response to the reduction in the pressures in the chambers 220 and 221 resulting from the use of fluid under pressure from the reservoir 3. This continued movement of the cylinder 202 in the direction of the right hand will permit further clockwise rocking of the lever 214 about pin 216 by the spring in the fuel control governor and a change in the governor setting to increase the speed of the diesel engine above fast idling speed and the opening of the air inlet valve 8 to increase the amount of atmospheric air that may flow through the inlet pipe 7 to the inlet valve chamber of the compressor 1 which is now loaded as hereinbefore explained.

From the above it is apparent that the speed of the diesel engine and the opening of air inlet valve 8 are increased, and the compressor 1 loaded automatically in response to the rate of flow of fluid under pressure from the reservoir 3 to the place of use.

After the compressor 1 is thus loaded, the fluid that is compressed by the compressor 1 is supplied to the reservoir 3 through pipe 9. However, the rate at which fluid under pressure is supplied to the reservoir 3 when the compressor 1 is first loaded and the speed of the engine increased slightly above fast idling speed is less than the rate at which it is flowing from the reservoir 3. Consequently, the pressures in the chambers 220 and 221 will continue to reduce to cause the stem 185 to continue to move in the direction of the right hand and permit a further increase in the speed of the engine and the output of the compressor 1.

Since it has been assumed that the devices located at the place of use of the fluid under pressure are operating at less than maximum speed and load, the limited rate of flow of fluid under pressure from the reservoir 3 is not great enough to provide the differential of forces on the stem 185 of the control device 182 required to increase the speed of the diesel engine to full speed, but will provide a differential of forces on stem 185 sufficient to automatically increase the speed of the engine proportional to this rate of flow. As a consequence of this increase in the speed of the engine, the output of the compressor 1 will be increased. When the output of the compressor 1 has been increased until the quantity of fluid under pressure supplied per minute to the reservoir 3 is the same as the quantity per minute that flows from the reservoir to the place of use, there will be no further reduction in the pressures in the reservoir 3 and in the chambers 220 and 221 to effect a further increase in the speed of the engine. Consequently, when the speed of the engine and the output of the compressor 1 have been increased sufficiently to establish this state of equilibrium, there will be no further change in the speed of the engine as long as the rate of use of fluid under pressure from the reservoir remains constant.

If now the speed of, and the load on the devices located at the place of use of the fluid under pressure are reduced, or increased until the devices are operating at their maximum speed and under maximum load, the governing apparatus 182 will respond to these changes in the same way as the control device 4 shown in FIG. 1 and will operate to control the diesel engine and the compressor 1 the same as the control device 4. Therefore, a detailed description of the operation of the governing apparatus 182 in response to a reduction or an increase in the speed and load on these devices is not necessary.

Although three forms of a pneumatically controlled governor embodying the invention are shown and described herein, it is to be understood that various changes and modifications may be made therein within the scope of the appended claims without departing from the spirit and scope of the invention.

Having now described the invention, what I claim as new and desire to secure by Letters Patent, is:

1. A fluid pressure responsive governor control apparatus comprising a casing, a differential area abutment means in said casing having two diaphragms of unequal area, a first chamber formed between said two diaphragms and a second chamber formed between the larger of said diaphragms and said casing, said differential area abutment means being movable in one direction in response to a simultaneous and equal increase in unit pressure supplied to said first and said second chambers above a first chosen unit pressure, and movable in the opposite direction in response to reduction of the unit pressure in said second chamber below the unit pressure in said first chamber, means preventing movement of said differential abutment means in said one direction until the unit pressure in said first chamber exceeds said first chosen unit pressure, and a control element operated by said differential area abutment means.

2. A fluid pressure responsive governor control apparatus comprising in combination:
  (a) a casing,
  (b) a differential area abutment means in said casing having two diaphragms of unequal area,
  (c) a first chamber formed in said casing between said two diaphragms,
  (d) a second chamber formed between the larger of said diaphragms and said casing,
  (e) said differential area abutment means being movable out of a certain position in one direction in response to a simultaneous and equal increase in fluid pressure supplied to said first and said second chambers above a first chosen pressure and movable toward said certain position in the opposite direction in response to the pressure in said first chamber exceeding the pressure in said second chamber,
  (f) means preventing movement of said differential abutment means in said one direction until the fluid pressure supplied to said first chamber exceeds said first chosen pressure, and
  (g) means operative in response to movement of said differential area abutment means.

3. A fluid pressure responsive governor control apparatus comprising in combination:
  (a) a casing,
  (b) a differential area abutment means in said casing having two diaphragms of unequal area,
  (c) a first chamber formed in said casing between said two diaphragms,
  (d) a second chamber formed between the larger of said diaphragms and said casing,
  (e) said differential area abutment means being movable out of a certain position in one direction in response to a simultaneous and equal increase in fluid pressure supplied to said first and said second chambers above a first chosen pressure and movable in the opposite direction toward said certain position in response to the pressure in said first chamber exceeding the pressure in said second chamber,
  (f) means preventing movement of said differential abutment means in said one direction until the fluid pressure supplied to said first chamber exceeds said first chosen pressure, and
  (g) means operative in response to movement of said differential area abutment means in said one direction and said opposite direction.

4. A fluid pressure responsive governor control apparatus comprising a casing, a differential area abutment means in said casing having two diaphragms of unequal area, a first chamber formed between said two diaphragms and a second chamber formed between the larger of said diaphragms and said casing, said differential area abutment means being movable in one direction in response to a simultaneous and equal increase in fluid pressure supplied to said first and said second chambers above a first chosen pressure and movable in the opposite direction in response to a fluid pressure supplied to said first chamber exceeding the pressure in said second chamber, means preventing movement of said differential abutment means in said one direction until the pressure in said first chamber exceeds said first chosen pressure, and a normally closed valve means operable to an open position by said differential area abutment means upon the pressures in said first and second chambers being equal and exceeding said first chosen pressure a chosen degree to supply fluid under pressure for a desired control operation.

5. A fluid pressure responsive governor control apparatus comprising a casing, a differential area abutment means having two diaphragms of unequal area, a first chamber formed between said two diaphragms, a second chamber formed between the larger of said diaphragms and said casing, a movable abutment arranged in parallel spaced-apart relationship to said differential area abutment means and having an effective area greater than the effective area of the smaller and less than the effective area of the larger diaphragms of said differential abutment means, said movable abutment and said casing section forming a third chamber which is open to said first chamber, a lever having one end operatively connected to said differential area abutment means and the other end operatively connected to said movable abutment, a fulcrum for said lever, said fulcrum constituting a cupped-shaped spring cage having a cone-shaped end contacting said lever intermediate the ends of the lever, an adjustable spring seat carried within said cage, a spring disposed between said spring seat and said spring cage to bias the ends of said lever in one direction to oppose movement of said ends in the opposite direction in response to fluid pressure forces acting on said diaphragms, and a stop to limit movement of said movable abutment in said opposite direction and rocking of said other end of said lever by said movable abutment against the biasing force of said spring upon the supply of fluid pressure to said one and third chambers reaching a chosen value and thereafter render only said differential abutment means effective to rock said one end of said lever against the biasing force of said spring in response to the force established in response to a simultaneous and equal increase in the fluid pressure supplied to said three chambers above said chosen value.

6. A fluid pressure responsive governor control apparatus comprising two casing sections, a cover, a differential area abutment means having two diaphragms of unequal area, the periphery of the smaller being clamped between said two casing sections and the periphery of the larger between one of said casing sections and said cover, a first chamber formed between said two diaphragms, a second chamber formed between the larger of said diaphragms and said cover, a third diaphragm arranged in parallel spaced-apart relationship to said differential area abutment means and having an effective area greater than the effective area of the smaller and less than the effective area of the larger diaphragm of said differential abutment means, the periphery of said third diaphragm being clamped between said two casing sections so that the peripheries of said third diaphragm and said smaller diaphragm lie in the same plane, said third diaphragm and said one casing section forming a third chamber which is open to said first chamber, a lever having one end operatively connected to said differential area abutment means, and the other end operatively connected to said third diaphragm, a fulcrum for said lever, said fulcrum constituting a cupped-shaped spring cage having a cone-shaped end contacting said lever midway between the ends of the lever, an adjustable spring seat carried within said cage, a spring disposed between said spring seat and said spring cage to bias the ends of said lever in one direction to oppose movement of said ends in the opposite direction in response to fluid pressure forces acting on said diaphragms, a stop to limit movement of said third diaphragm in said opposite direction and rocking of said other end of said lever by said third diaphragm against the biasing force of said spring upon the supply of fluid pressure to said first and third chambers reaching a chosen value and thereafter render only said differential abutment means effective to rock said one end of said lever against the biasing force of said spring in response to an increase in the fluid pressure supplied to said three chambers above said chosen value, and a supply and release valve mechanism having a normally closed supply valve and a normally open release valve and being operable by said differential area abutment means upon the pressure in said three chambers reaching a value substantially higher than said first-mentioned chosen value to close said release valve and open said supply valve.

7. A fluid pressure responsive governor control apparatus comprising a casing, a differential area abutment means in said casing having two diaphragms of unequal effective area, a first chamber formed between said two diaphragms, a second chamber formed between the larger of said diaphragms and said casing, a third chamber formed between the smaller of said diaphragms and said casing, said differential area abutment means being movable in one direction in response to a simultaneous and equal increase in fluid pressure supplied to said first chamber and said second chamber above a first chosen pressure, and movable in the opposite direction in response to the fluid pressure in said first chamber exceeding the fluid pressure in said second chamber, a spring opposed diaphragm operated valve mechanism operable to open a communication between said first chamber and said third chamber upon the pressure in said first chamber not exceeding said first chosen pressure and operable to close said communication upon the pressure in said first and second chambers exceeding said first chosen pressure to prevent further supply of fluid under pressure from said first chamber to said third chamber, said trapped pressure in said third chamber resiliently opposing movement of said differential area abutment means in said one direction upon a simultaneous and equal increase in the fluid pressure supplied to said first chamber and said second chamber above said first chosen pressure, and a control element operated by said differential area abutment means.

8. A fluid pressure responsive governor control apparatus, comprising a casing, a differential area abutment means in said casing having two diaphragms of unequal effective area, a first chamber formed between said two diaphragms, a second chamber formed between the larger of said diaphragms and said casing, a third chamber formed between the smaller of said diaphragms and said casing, said differential area abutment means being movable in one direction in response to a simultaneous and equal increase in fluid pressure supplied to said first chamber and said second chamber above a first chosen pressure, and movable in the opposite direction in response to the fluid pressure in said first chamber exceeding the fluid pressure in said second chamber, a spring-opposed diaphragm operated regulating valve mechanism comprising a first valve means operable to open a communication between said first chamber and said third chamber upon the pressure in said first chamber not exceeding said first chosen pressure and operable to close said communication upon the pressure in said second chamber exceeding said first chosen pressure to trap fluid under pressure in said third chamber and prevent further supply of fluid under pressure from said first chamber to said third chamber, and a second valve means operable to open a communication between said third chamber and atmosphere upon an increase in said trapped pressure in said third chamber in response to movement of said differential area abutment means in said one direction against the resisting force of said trapped pressure upon a simultaneous and equal increase in the fluid pressure supplied to said first chamber and said second chamber above said first chosen pressure, a cylindrical hollow control element operated by said differential area abutment means, a fluid pressure motor having a spring-opposed piston carried on one end of said control element and a cylinder in which said spring-opposed piston is slidably mounted, said spring-opposed piston and said cylinder cooperating to form a chamber into which one end of said cylindrical hollow control element opens, and a normally closed valve operable by said control element upon the simultaneous and equal increase in pressure in the fluid pressure supplied to said first chamber and said second chamber exceeding said first chosen pressure a chosen degree to an open position to establish a fluid pressure communication through which fluid under pressure may be supplied from said first chamber via the interior of said cylindrical hollow control element to said chamber to effect movement of said cylinder relative to said spring-opposed piston.

References Cited in the file of this patent

UNITED STATES PATENTS

| | | |
|---|---|---|
| 2,023,721 | Barney | Dec. 10, 1935 |
| 2,134,615 | Lamb | Oct. 25, 1938 |
| 2,529,437 | Weinberger | Nov. 7, 1950 |
| 2,546,613 | Paget | Mar. 27, 1951 |
| 2,629,536 | Baker | Feb. 24, 1953 |
| 2,635,596 | Adler | Apr. 21, 1953 |
| 2,653,753 | Davey | Sept. 29, 1953 |
| 2,661,893 | Le Valley | Dec. 8, 1953 |
| 2,678,034 | Nallinger | May 11, 1954 |
| 2,704,631 | Bancel | Mar. 22, 1955 |
| 2,719,517 | Adler | Oct. 4, 1955 |